US011556336B2

(12) United States Patent
Pakiteeri et al.

(10) Patent No.: US 11,556,336 B2
(45) Date of Patent: Jan. 17, 2023

(54) SYSTEM FOR COMPUTER CODE DEVELOPMENT ENVIRONMENT CLONING AND AUTHENTICATION USING A DISTRIBUTED SERVER NETWORK AND MACHINE LEARNING

(71) Applicant: BANK OF AMERICA CORPORATION, Charlotte, NC (US)

(72) Inventors: Varun Sasi Pakiteeri, Malappuram (IN); Raja Arumugam Maharaja, Chennai (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 74 days.

(21) Appl. No.: 17/176,698

(22) Filed: Feb. 16, 2021

(65) Prior Publication Data

US 2022/0261242 A1 Aug. 18, 2022

(51) Int. Cl.
*G06F 8/75* (2018.01)
*G06F 8/65* (2018.01)
*G06N 20/00* (2019.01)
*H04L 67/10* (2022.01)
*G06N 5/04* (2006.01)

(52) U.S. Cl.
CPC ............... *G06F 8/751* (2013.01); *G06F 8/65* (2013.01); *G06N 5/04* (2013.01); *G06N 20/00* (2019.01); *H04L 67/10* (2013.01)

(58) Field of Classification Search
CPC .. G06F 8/751; G06F 8/65; G06N 5/04; G06N 20/00; H04L 67/10
See application file for complete search history.

(56) References Cited

U.S. PATENT DOCUMENTS

| 7,418,699 | B2 | 8/2008 | Metzger et al. |
| 8,140,907 | B2 | 3/2012 | Beaty et al. |
| 8,245,192 | B1 | 8/2012 | Chen |
| 8,387,045 | B2 | 2/2013 | Yasutaka |
| 8,407,518 | B2 | 3/2013 | Nelson |
| 8,661,406 | B2 | 2/2014 | Shapiro |
| 8,832,028 | B2 | 9/2014 | Susairaj et al. |
| 8,954,929 | B2 | 2/2015 | Braude |
| 9,009,183 | B2 | 4/2015 | Ahmed et al. |
| 9,116,743 | B2 | 8/2015 | Suzuki |
| 9,330,013 | B2 | 5/2016 | Li et al. |

(Continued)

*Primary Examiner* — Daxin Wu
(74) *Attorney, Agent, or Firm* — Moore & Van Allen PLLC; Seongun M. Hong

(57) ABSTRACT

A system is provided for computer code development environment cloning and authentication using a distributed server network and machine learning. In particular, the system may use a machine learning algorithm configured to automatically identify and analyze changes in computing code between two or more environments and publish a record of said changes to a private distributed register stored on a plurality of distributed server nodes. Based on the analysis, the system may generate one or more recommended changes to the source code. If the changes are confirmed by one or more authorized users, the system may automatically implement the changes and publish a confirmation record of the implemented changes to the distributed register. In this way, the system may provide an efficient way to ensure synchronization of code across multiple computing environments.

20 Claims, 3 Drawing Sheets

(56) References Cited

U.S. PATENT DOCUMENTS

| | | | |
|---|---|---|---|
| 9,471,288 B2 | 10/2016 | Miller et al. | |
| 9,514,004 B2 | 12/2016 | Beeken | |
| 9,632,771 B2 | 4/2017 | Foub | |
| 9,798,881 B2 | 10/2017 | Davidson et al. | |
| 10,713,151 B1* | 7/2020 | Zinger | G06F 11/3684 |
| 2006/0288260 A1* | 12/2006 | Xiao | G05B 23/0232 |
| | | | 714/48 |
| 2007/0294696 A1 | 12/2007 | Papakipos et al. | |
| 2011/0197097 A1 | 8/2011 | Beaty et al. | |
| 2012/0159434 A1* | 6/2012 | Dang | G06F 8/36 |
| | | | 717/120 |
| 2016/0335007 A1 | 11/2016 | Ryu et al. | |
| 2017/0357558 A1 | 12/2017 | Kato | |
| 2019/0108001 A1* | 4/2019 | Hauser | G06F 11/3668 |
| 2019/0129712 A1* | 5/2019 | Hawrylo | G06F 8/20 |
| 2020/0019493 A1* | 1/2020 | Ramakrishna | G06F 11/3688 |
| 2020/0089651 A1* | 3/2020 | Savelieva | G06N 20/00 |
| 2021/0049024 A1 | 2/2021 | Ruder et al. | |
| 2021/0406721 A1* | 12/2021 | Pathak | G07F 19/211 |

* cited by examiner

US 11,556,336 B2

SYSTEM FOR COMPUTER CODE DEVELOPMENT ENVIRONMENT CLONING AND AUTHENTICATION USING A DISTRIBUTED SERVER NETWORK AND MACHINE LEARNING

FIELD OF THE INVENTION

The present disclosure embraces a system for computer code development environment cloning and authentication using a distributed server network and machine learning.

BACKGROUND

There is a need for an efficient and expedient way to perform reconciliation of computing code across development environments.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

A system is provided for computer code development environment cloning and authentication using a distributed server network and machine learning. In particular, the system may use a machine learning algorithm configured to automatically identify and analyze changes in computing code between two or more environments and publish a record of said changes to a private distributed register stored on a plurality of distributed server nodes. Based on the analysis, the system may generate one or more recommended changes to the source code. If the changes are confirmed by one or more authorized users, the system may automatically implement the changes and publish a confirmation record of the implemented changes to the distributed register. If the changes are rejected, the system may publish a confirmation record of the rejection of the recommended changes. In this way, the system may provide an efficient way to ensure synchronization of code across multiple computing environments.

Accordingly, embodiments of the present disclosure provide a system for computer code development environment cloning and authentication using a distributed server network and machine learning. The system may comprise a memory device with computer-readable program code stored thereon; a communication device; and a processing device operatively coupled to the memory device and the communication device, wherein the processing device is configured to execute the computer-readable program code to detect, using a machine learning algorithm, a change in a first set of code within a first environment; execute a parallel analysis on the first set of code using the machine learning algorithm, wherein the parallel analysis comprises: pulling a second set of code and data associated with the second set of code from a second environment; and predicting one or more effects of the change in the first set of code on the second set of code; determine, based on the parallel analysis, that the second set of code requires an update; submit a proposed data record to a distributed server network for addition to a distributed register, wherein the proposed data record comprises one or more recommended actions based on the parallel analysis; receive, from a plurality of nodes of the distributed server network, one or more consensus inputs associated with the proposed data record; and based on the consensus inputs, append the proposed data record to the distributed register.

In some embodiments, the one or more consensus inputs comprise one or more approvals of the one or more recommended actions within the proposed data record, wherein the computer-readable program code further causes the processing device to, based on the one or more approvals, automatically execute the recommended actions.

In some embodiments, the one or more consensus inputs comprise one or more rejections of the one or more recommended actions within the proposed data record, wherein the computer-readable program code further causes the processing device to add an indication that the one or more recommended actions have been rejected to the proposed data record.

In some embodiments, the one or more recommendations comprises a change in the second set of code based on the change in the first set of code.

In some embodiments, the one or more recommendations comprises a change in the first set of code based on the change in the first set of code.

In some embodiments, the change in the first set of code comprises at least one of a layout change and a structure change.

In some embodiments, the one or more effects of the change in the first set of code comprises a data type change.

Embodiments of the present disclosure also provide a computer program product for computer code development environment cloning and authentication using a distributed server network and machine learning, the computer program product comprising at least one non-transitory computer readable medium having computer-readable program code portions embodied therein, the computer-readable program code portions comprising executable portions for detecting, using a machine learning algorithm, a change in a first set of code within a first environment; executing a parallel analysis on the first set of code using the machine learning algorithm, wherein the parallel analysis comprises: pulling a second set of code and data associated with the second set of code from a second environment; and predicting one or more effects of the change in the first set of code on the second set of code; determining, based on the parallel analysis, that the second set of code requires an update; submitting a proposed data record to a distributed server network for addition to a distributed register, wherein the proposed data record comprises one or more recommended actions based on the parallel analysis; receiving, from a plurality of nodes of the distributed server network, one or more consensus inputs associated with the proposed data record; and based on the consensus inputs, appending the proposed data record to the distributed register.

In some embodiments, the one or more consensus inputs comprise one or more approvals of the one or more recommended actions within the proposed data record, wherein the computer-readable program code portions further comprise executable portions for, based on the one or more approvals, automatically executing the recommended actions.

In some embodiments, the one or more consensus inputs comprise one or more rejections of the one or more recommended actions within the proposed data record, wherein the computer-readable program code portions further comprise executable portions for adding an indication that the one or more recommended actions have been rejected to the proposed data record.

In some embodiments, the one or more recommendations comprises a change in the second set of code based on the change in the first set of code.

In some embodiments, the one or more recommendations comprises a change in the first set of code based on the change in the first set of code.

In some embodiments, the change in the first set of code comprises at least one of a layout change and a structure change.

Embodiments of the present disclosure also provide a computer-implemented method for computer code development environment cloning and authentication using a distributed server network and machine learning, the computer-implemented method comprising detecting, using a machine learning algorithm, a change in a first set of code within a first environment; executing a parallel analysis on the first set of code using the machine learning algorithm, wherein the parallel analysis comprises: pulling a second set of code and data associated with the second set of code from a second environment; and predicting one or more effects of the change in the first set of code on the second set of code; determining, based on the parallel analysis, that the second set of code requires an update; submitting a proposed data record to a distributed server network for addition to a distributed register, wherein the proposed data record comprises one or more recommended actions based on the parallel analysis; receiving, from a plurality of nodes of the distributed server network, one or more consensus inputs associated with the proposed data record; and based on the consensus inputs, appending the proposed data record to the distributed register.

In some embodiments, the one or more consensus inputs comprise one or more approvals of the one or more recommended actions within the proposed data record, wherein the computer-implemented method further comprises, based on the one or more approvals, automatically executing the recommended actions.

In some embodiments, the one or more consensus inputs comprise one or more rejections of the one or more recommended actions within the proposed data record, wherein the computer-implemented method further comprises adding an indication that the one or more recommended actions have been rejected to the proposed data record.

In some embodiments, the one or more recommendations comprises a change in the second set of code based on the change in the first set of code.

In some embodiments, the one or more recommendations comprises a change in the first set of code based on the change in the first set of code.

In some embodiments, the change in the first set of code comprises at least one of a layout change and a structure change.

In some embodiments, the one or more effects of the change in the first set of code comprises a data type change.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
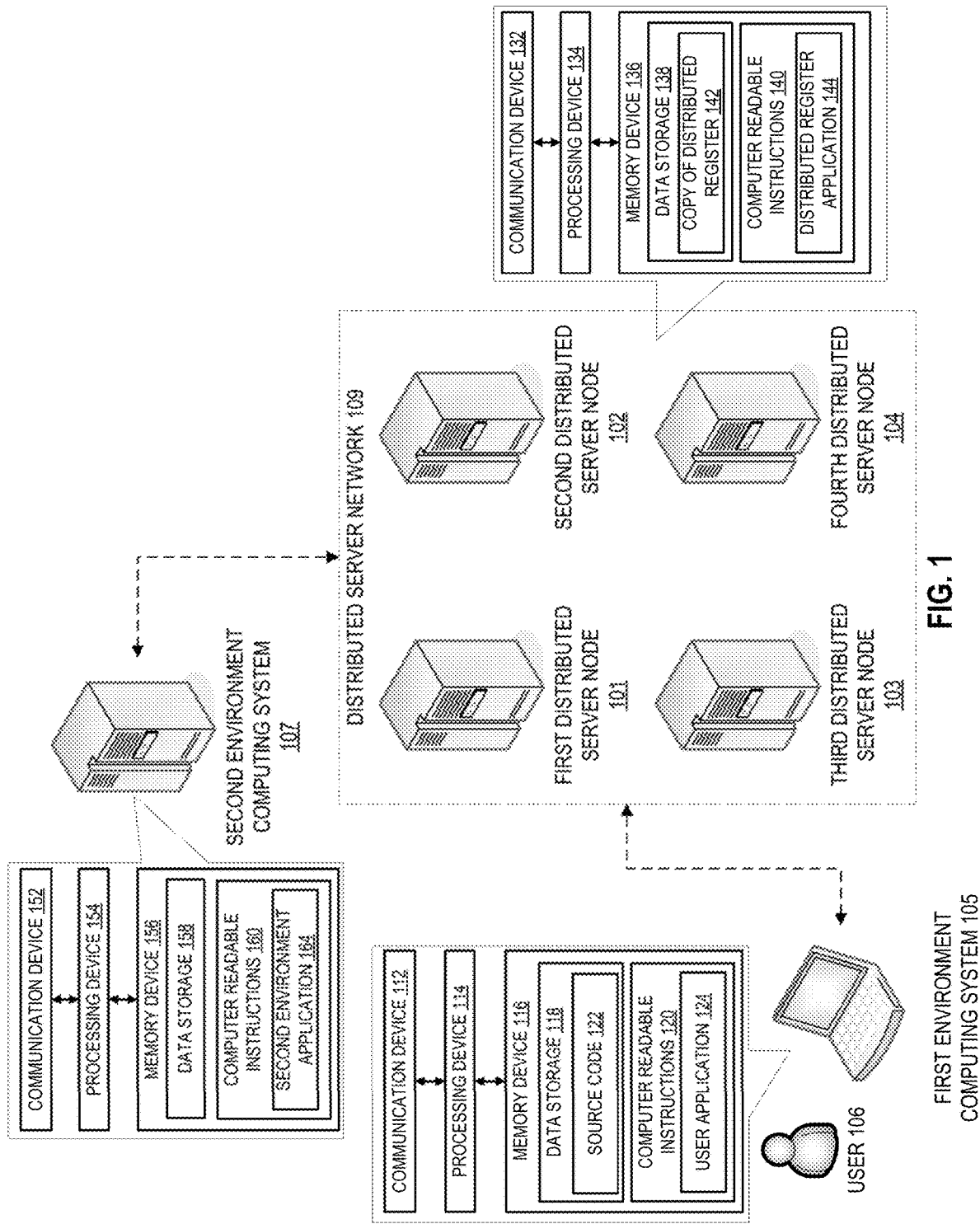
Figure 2:
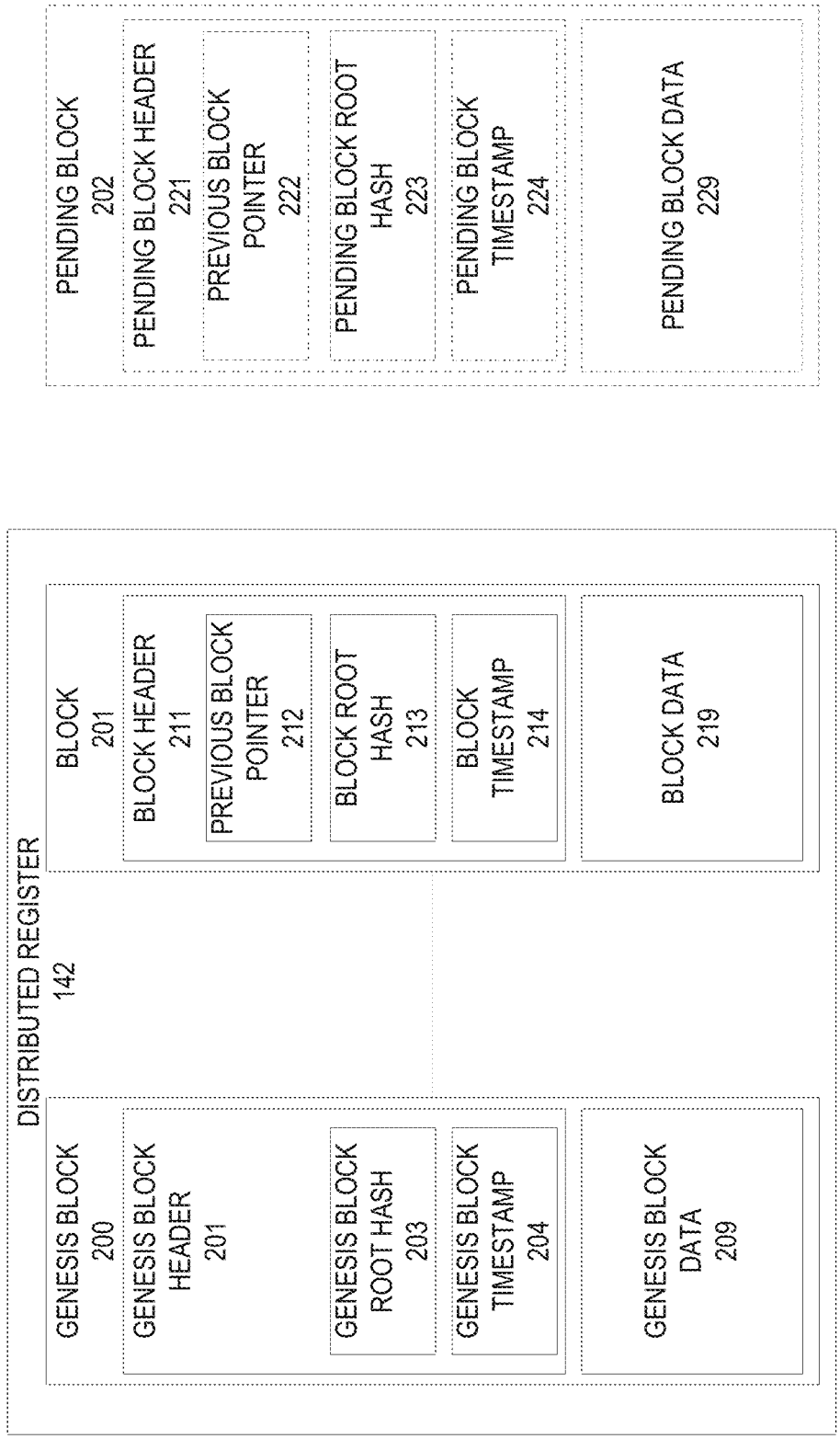
Figure 3:
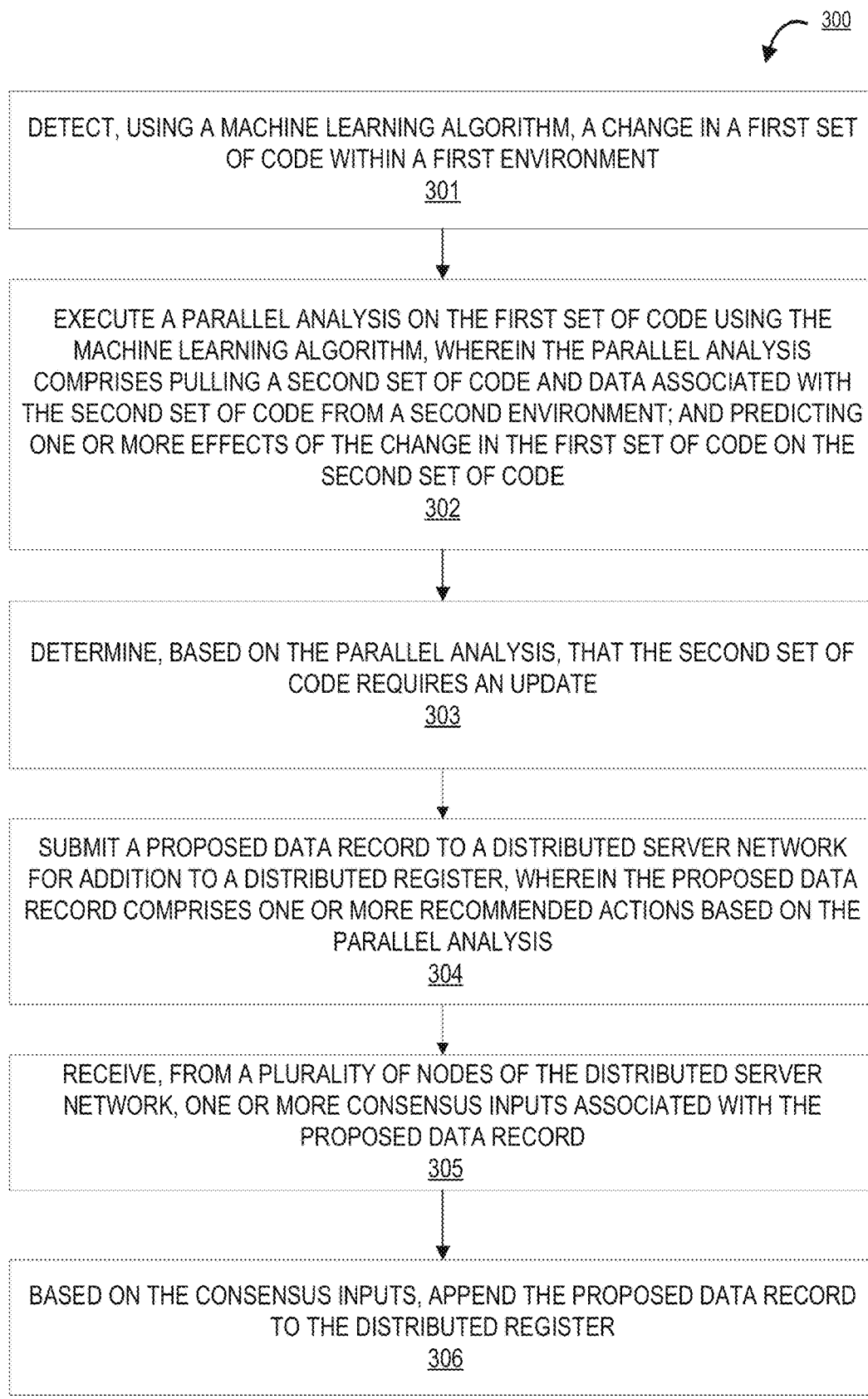

Having thus described embodiments of the invention in general terms, reference will now be made to the accompanying drawings, wherein:

FIG. 1 illustrates an operating environment for the distributed computer code synchronization system, in accordance with one embodiment of the present disclosure;

FIG. 2 is a block diagram illustrating the data structures within an exemplary distributed register, in accordance with one embodiment of the present disclosure; and FIG. 3 is a flow diagram illustrating a process for performing synchronization of computer code across multiple computing environments using a distributed register, in accordance with one embodiment of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization such as a financial institution, a non-profit organization, a government organization, and the like, which may routinely use various types of applications within its enterprise environment to accomplish its organizational objectives.

"The system" or "entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, as used herein the term "user device" or "mobile device" may refer to mobile phones, personal computing devices, tablet computers, wearable devices, and/or any portable electronic device capable of receiving and/or storing data therein.

"Distributed register," which may also be referred to as a "distributed ledger," as used herein may refer to a structured list of data records that is decentralized and distributed amongst a plurality of computing systems and/or devices. In some embodiments, the distributed ledger may use a linked block structure.

"Linked block," "linked block structure," or "blockchain" as used herein may refer to a data structure which may comprise a series of sequentially linked "blocks," where each block may comprise data and metadata. The "data" within each block may comprise one or more "data record" or "transactions," while the "metadata" within each block may comprise information about the block, which may include a timestamp, a hash value of data records within the block, and a pointer (e.g., a hash value) to the previous block in the linked block structure. In this way, beginning from an originating block (e.g., a "genesis block"), each block in the linked block structure is linked to another block via the pointers within the block headers. If the data or metadata within a particular block in the linked block structure becomes corrupted or modified, the hash values found in the header of the affected block and/or the downstream blocks may become mismatched, thus allowing the system to detect that the data has been corrupted or modified.

A "linked block ledger" may refer to a distributed ledger which uses linked block data structures. Generally, a linked block ledger is an "append only" ledger in which the data within each block within the linked block ledger may not be modified after the block is added to the linked block ledger; data may only be added in a new block to the end of the linked block ledger. In this way, the linked block ledger may provide a practically immutable ledger of data records over time.

"Permissioned distributed register" as used herein may refer to a linked block ledger for which an access control mechanism is implemented such that only known, authorized users may take certain actions with respect to the linked block ledger (e.g., add new data records, participate in the consensus mechanism, or the like). Accordingly, "unpermissioned distributed ledger" as used herein may refer to a linked block ledger without an access control mechanism.

"Private distributed register" as used herein may refer to a linked block ledger accessible only to users or devices that meet specific criteria (e.g., authorized users or devices of a certain entity or other organization). Accordingly, a "public distributed ledger" is a linked block ledger accessible by any member or device in the public realm.

"Node" as used herein may refer to a computing system on which the distributed ledger is hosted. In some embodiments, each node maintains a full copy of the distributed ledger. In this way, even if one or more nodes become unavailable or offline, a full copy of the distributed ledger may still be accessed via the remaining nodes in the distributed ledger system. That said, in some embodiments, the nodes may host a hybrid distributed ledger such that certain nodes may store certain segments of the linked block ledger but not others.

"Consensus," "consensus algorithm," or "consensus mechanism" as used herein may refer to the process or processes by which nodes come to an agreement with respect to the contents of the distributed ledger. Changes to the ledger (e.g., addition of data records) may require consensus to be reached by the nodes in order to become a part of the authentic version of the ledger. In this way, the consensus mechanism may ensure that each node maintains a copy of the distributed ledger that is consistent with the copies of the distributed ledger hosted on the other nodes; if the copy of the distributed ledger hosted on one node becomes corrupted or compromised, the remaining nodes may use the consensus algorithm to determine the "true" version of the distributed ledger. The nodes may use various different mechanisms or algorithms to obtain consensus, such as proof-of-work ("PoW"), proof-of-stake ("PoS"), practical byzantine fault tolerance ("PBFT"), proof-of-authority ("PoA"), or the like.

"Smart contract" as used herein may refer to executable computer code or logic that may be executed according to an agreement between parties upon the occurrence of a condition precedent (e.g., a triggering event such as the receipt of a proposed data record). In some embodiments, the smart contract may be self-executing code that is stored in the distributed ledger, where the self-executing code may be executed when the condition precedent is detected by the system on which the smart contract is stored.

"Testing environment" or "lower level environment" ("LLE") as used herein may refer to a computing environment in which software or applications are developed, tested, and/or staged. Accordingly, applications within the LLE may require testing data and/or testcases to ensure the functionality and stability of the applications and features in development.

"Production environment" as described herein may refer to a computing environment in which the computing systems within the environment are currently in use to service the entity's operations. Accordingly, applications that have been deployed to the production environment may be considered to be "live."

In the context of software and application development and/or testing, multiple computing environments may exist within an entity's network. For instance, applications being developed in the testing environment may be deployed to a production environment. In such a scenario, any updates or changes to the application may go through a testing phase before such updates or changes are applied to the applications in the production environment. In some cases, such changes or updates may introduce alterations (e.g., layout change, code change, structure change, or the like) that may have certain consequences that are not be detected during regression testing of the application. For instance, a layout change may introduce a change in a certain data type or data input file (e.g., changes in a database schema) handled by the application but may not necessarily break the process during regression testing. Accordingly, there is a need for a way to automatically identify and implement necessary changes to software code across multiple computing environments for reconciliation purposes.

Accordingly, the system as described herein provides an efficient and expedient way to automatically identify code changes in one environment that may result in inconsistencies in another environment. For example, upstream changes in the source code may have various difference consequences in downstream applications (e.g., changes that may cause applications to process data incorrectly). In this regard, the system may comprise a machine learning module and/or a plurality of distributed server nodes each hosting a copy of a distributed register. The machine learning module may be configured to automatically identify changes in the source code (e.g., in the testing environment) and transmit a first proposed data record to the distributed register, where the first proposed data record may contain the identified changes. In parallel to identifying the changes, the system may execute an analysis of the code changes by pulling all the relevant data from the production environment into the testing environment and determining what downstream changes may need to be made to perform reconciliation with the upstream changes. For instance, the system may determine that a data type in the downstream code should be changed or that data length constraints should be enforced to increase performance. Accordingly, in some embodiments, the analysis may comprise both a code analysis and a data driven analysis.

Based on said analysis, the system may generate one or more recommendations with respect to changing the code of the downstream application. For instance, the system may recommend changing the code of the downstream application to accommodate changes to data definitions or data types caused by changes in the source code layout. The system may store the one or more recommendations within a second proposed data record to be submitted to the plurality of nodes and stored on the distributed register.

The plurality of nodes may then, via a consensus algorithm, approve or reject the proposed data records. In some embodiments, approval of the proposed data records by one or more users may be required by the system. For instance, one or more users associated with the code and/or application (e.g., the code developer, administrator, application user, or the like) may be required to approve or reject the one or more recommendations to change the downstream code. In this regard, the system may be configured, upon detecting the proposed data record, to transmit a push notification (e.g., a pop-up alert) to the computing systems of the one or more users with which the code is associated. The notification may be displayed on a graphical interface of each user computing system, where the notification may include the details of the recommendations, including the code changes within the source, the consequences of such a source change (e.g., a change in data type), and one or more recommended action steps to address such consequences (e.g., code change in the production environment to accommodate the change in data type). The notification may further comprise one or more interactable interface elements (e.g., buttons) that allow the user to approve or reject the proposed recommended action steps (e.g., approve and reject buttons). In some embodiments, the system may require that all of the users approve the changes. In other embodiments, the system may require that only a subset of the users approve the changes (e.g., administrators).

Upon receiving approval from the requisite number of users, the system may append the proposed data record to the distributed register and automatically implement the recommended action steps within the production environment. In this regard, the system may "clone" the changes within the source code in the testing environment into the production environment for reconciliation. Accordingly, the recommended code changes and/or data/database changes may be read from the data record within the distributed register.

If the proposed data record is rejected, in some embodiments, the proposed data record may be placed in a temporary storage location for further evaluation. In other embodiments, the proposed data record may be appended to the distributed register with an indication that the data record was rejected and one or more reasons for the rejection. In this way, the distributed register may serve as a decentralized repository of code changes and/or cloned data as well as a detailed log of the code development and/or reconciliation process.

The system as described herein confers a number of technological advantages over conventional code reconciliation systems. For instance, by using the machine learning module as described herein, the system may automatically identify and implement necessary code changes across environments without the need for manual code synchronization. Furthermore, by using a distributed data register, the system may provide a durable repository of information that may capture all of the changes that have been implemented (or not implemented) across all environments during the code development process.

Turning now to the figures, FIG. 1 illustrates an operating environment 100 for the distributed computer code synchronization system, in accordance with one embodiment of the present disclosure. In particular, FIG. 1 illustrates a first distributed server node 101, a second distributed server node 102, a third distributed server node 103, and a fourth distributed server node 104 within a distributed server network 109, where each of the nodes 101, 102, 103 host a copy of a distributed register 142, as will be described in further detail below. A first environment computing system 105, and a second environment computing system 107 may be communicatively coupled with one or more of the nodes 101, 102, 103, 104 within the distributed server network 109. The nodes 101, 102, 103, 104 may further be communicatively coupled with one another such that the nodes may send data to and receive data from the other nodes within the distributed server network 109.

It should be understood that FIG. 1 illustrates only an exemplary embodiment of the operating environment 100, and it will be appreciated that the operating environment 100 may comprise fewer or greater numbers of computing systems than what is depicted in FIG. 1 in various different orientations and/or configurations. For example, though FIG. 1 depicts four distributed server nodes 101, 102, 103, 104, it is within the scope of the disclosure for the distributed server network 109 to comprise fewer nodes (e.g., two or three) or more nodes (e.g., four, five, and the like) depending on the particular implementation of the system as described herein. Similarly, though the first environment computing system 105 and second environment computing system 107 are each depicted in FIG. 1 as single units, the operating environment 100 may comprise multiple environment computing systems in communication with the nodes 101, 102, 103, 104. It should also be appreciated that one or more functions of the systems, devices, or servers as depicted in FIG. 1 may be combined into a single system, device, or server and/or performed by other computing systems. Furthermore, the functions of a single system, device, or server as depicted in FIG. 1 may be distributed across multiple computing systems. For instance, some of the machine-learning based processes may be performed on separate computing systems outside of the distributed server network 109.

The network may be a system specific distributive network receiving and distributing specific network feeds and identifying specific network associated triggers. The network may include one or more cellular radio towers, antennae, cell sites, base stations, telephone networks, cloud networks, radio access networks (RAN), Wi-Fi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the first distributed node 101, second distributed server node 102, third distributed server node 103, and the fourth distributed server node 104 may form a cluster of nodes that may perform the various code analysis and/or reconciliation processes as described herein. Accordingly, the nodes 101, 102, 103, 104 may store the computing code associated with the various applications that may be stored and/or executed across multiple computing environments and the changes made to such code, perform machine-learning based parallel analyses of the code, generate and transmit recommended action steps regarding the code, and the like. Accordingly, each of the nodes 101, 102, 103, 104 may comprise a communication device 132, a processing device 134, and a memory device 136, where the processing device 134 is operatively coupled to the communication device 132 and the memory device 136. The processing device 134 uses the communication device 132 to communicate with the network and other devices on the network. As such, the communication device 132 generally comprises a modem, antennae, Wi-Fi or Ethernet adapter, radio transceiver, or other device for communicating with other devices on the network.

The memory device 136 of each of the nodes 101, 102, 103, 104 may comprise computer-readable instructions 140 and data storage 138, where the data storage 138 may comprise a copy of a distributed register 142. The distributed register (and the copy of the distributed register 142) may comprise a series of data records relevant to the objectives of an entity associated with the distributed server network 109. For instance, the distributed register may comprise a series of data records which may contain the code from various computing environments, the changes made to the code over time, the analyses performed on the code, and the remediation processes executed on the code. In this regard, the computer-readable instructions 140 may have a distributed register application 144 stored thereon, where the distributed register application 144 may allow the nodes 101, 102, 103, 104 to read data from the distributed register, submit data records to the distributed register, participate in consensus mechanisms, or the like as needed to perform the code analysis and synchronization processes described herein.

As further illustrated in FIG. 1, the first environment computing system 105 may be in operative communication with the nodes 101, 102, 103, 104 within the distributed server network 109 and/or the second environment computing system 107. The first environment computing system 105 may be a computing system owned and/or operated by a user 106, where the user may be a developer for the entity (e.g., a computing system within the development environment). Accordingly, the first environment computing system 105 may comprise a communication device 112, a processing device 114, and a memory device 116. In some embodiments, the first environment computing system 105 may comprise hardware and/or software components that allow the first environment computing system 105 to interface with the user 106. In such embodiments, the first environment computing system 105 may comprise a user interface comprising one or more input devices (e.g., a keyboard, keypad, microphone, mouse, tracking device, biometric readers, capacitive sensors, or the like) and/or output devices (e.g., a display such as a monitor, projector, headset, touchscreen, and/or auditory output devices such as speakers, headphones, or the like).

As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The communication device 112, and other communication devices as described herein, may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the systems described herein may also include a communication interface device that may be connected by a hardwire connection to the resource distribution device. The interface device may comprise a connector such as a USB, SATA, PATA, SAS or other data connector for transmitting data to and from the respective computing system.

The memory device 116 of the first environment computing system 105 may further comprise data storage 118 and computer-readable instructions 120 stored thereon. The data storage 118 may have source code 122 stored therein, wherein the source code 122 may contain the code for an application that may be deployed within the network (e.g., within the production environment). Accordingly, the source code 122 may be analyzed (e.g., by the nodes 101, 102, 103, 104) using the machine learning processes described herein. The computer-readable instructions 120 may comprise a user application 124. The user application 124 may be a software application that the user 106 may use to review recommendations produced by the code analysis processes and provided inputs (e.g., approval or rejection) of the proposed recommendations.

As illustrated in FIG. 1, the second environment computing system 107 may be a computing system within a second computing environment (e.g., a production environment) that may be running an application that is being developed in the lower level environment. Accordingly, the second environment computing system 107 may comprise a processing device 154 operatively coupled to a communication device 152 and a memory device 156. The memory device 156 may comprise data storage 158 and computer readable instructions 160 stored thereon, where the computer readable instructions 160 may comprise a second environment application 164. The second environment application 164 may be a production application that is being developed and/or tested within the lower level environment. In particular, the code analysis process may analyze the source code 122 within the first environment computing system 105 for potential impacts on data type, data layouts, or the like of the data processed and/or stored by the second environment application 164.

The communication devices as described herein may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the distributed register node 103 may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user, may include any of a number of devices allowing the devices to receive data from a user, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic or other systems that perform various functions of the computing systems. These systems may comprise, for example, electrical circuits, motors, compressors, or any system that enables functioning of the computing systems.

FIG. 2 is a block diagram illustrating the data structures within an exemplary distributed register, in accordance with some embodiments. In particular, FIG. 2 depicts a plurality of blocks 200, 201 within the distributed register 142, in addition to a pending block 202 that has been submitted to be appended to the distributed register 142. The distributed register 142 may comprise a genesis block 200 that serves as the first block and origin for subsequent blocks in the distributed register 142. The genesis block 200, like all other blocks within the distributed register 142, comprise a block header 201 and block data 209. The genesis block data 209, or any other instances of block data within the distributed register 142 (or any other distributed register) may contain one or more data records. For instance, block data may comprise software source code, authentication data, transaction data, documents or other data containers, third party information, regulatory and/or legal data, or the like.

The genesis block header 201 may comprise various types of metadata regarding the genesis block data 209. In some embodiments, the block header 201 may comprise a genesis block root hash 203, which is a hash derived from an algorithm using the genesis block data 209 as inputs. In some embodiments, the genesis block root hash 203 may be a Merkle root hash, wherein the genesis block root hash 203 is calculated via a hash algorithm based on a combination of the hashes of each data record within the genesis block data 209. In this way, any changes to the data within the genesis block data 209 will result in a change in the genesis block root hash 203. The genesis block header 201 may further comprise a genesis block timestamp 204 that indicates the time at which the block was written to the distributed register 142. In some embodiments, the timestamp may be a Unix timestamp. In some embodiments, particularly in ledgers utilizing a PoW consensus mechanism, the block header 201 may comprise a nonce value and a difficulty value. The nonce value may be a whole number value that, when combined with the other items of metadata within the block header 201 into a hash algorithm, produces a hash output that satisfies the difficulty level of the cryptographic puzzle as defined by the difficulty value. For instance, the consensus mechanism may require that the resulting hash of the block header 201 falls below a certain value threshold (e.g., the hash value must start with a certain number of zeroes, as defined by the difficulty value).

A subsequent block 201 may be appended to the genesis block 200 to serve as the next block in the linked block structure. Like all other blocks, the subsequent block 201 comprises a block header 211 and block data 219. Similarly, the block header 211 comprise a block root hash 213 of the data within the block data 219 and a block timestamp 214. The block header 211 may further comprise a previous block pointer 212, which may be a hash calculated by combining the hashes of the metadata (e.g., the genesis block root hash 203, genesis block timestamp 204, and the like) within the block header 201 of the genesis block 200. In this way, the block pointer 212 may be used to identify the previous block (e.g., the genesis block 200) in the distributed register 142, thereby creating a "chain" comprising the genesis block 200 and the subsequent block 201.

The value of a previous block pointer is dependent on the hashes of the block headers of all of the previous blocks in the chain; if the block data within any of the blocks is altered, the block header for the altered block as well as all subsequent blocks will result in different hash values. In other words, the hash in the block header may not match the hash of the values within the block data, which may cause subsequent validation checks to fail. Even if an unauthorized user were to change the block header hash to reflect the altered block data, this would in turn change the hash values of the previous block pointers of the next block in the sequence. Therefore, an unauthorized user who wishes to alter a data record within a particular block must also alter the hashes of all of the subsequent blocks in the chain in order for the altered copy of the ledger to pass the validation checks imposed by the consensus algorithm. Thus, the computational impracticability of altering data records in a ledger in turn greatly reduces the probability of improper alteration of data records.

A pending block 202 or "proposed block" may be submitted for addition to the distributed register 142. The pending block 202 may comprise a pending block header 221, which may comprise a pending block root hash 223, a previous block pointer 222 that points to the previous block 201, a pending block timestamp 224, and pending block data 229. Once a pending block 202 is submitted to the system, the nodes within the system may validate the pending block 202 via a consensus algorithm. The consensus algorithm may be, for instance, a proof of work mechanism, in which a node determines a nonce value that, when combined with a hash of the block header 211 of the last block in the linked block structure, produces a hash value that falls under a specified threshold value. For instance, the PoW algorithm may require that said hash value begins with a certain number of zeroes. Once said nonce value is determined by one of the nodes, the node may post the "solution" to the other nodes. Once the solution is validated by the other nodes, the hash of the block header 211 is included in the pending block header 221 of the pending block 202 as the previous block pointer 222. The pending block header 221 may further comprise the pending block root hash 223 of the pending block data 229 which may be calculated based on the winning solution. The pending block 202 is subsequently considered to be appended to the previous block 201 and becomes a part of the distributed register 142. A pending block timestamp 224 may also be added to signify the time at which the pending block 202 is added to the distributed register 142.

In other embodiments, the consensus mechanism may be based on a total number of consensus inputs submitted by the nodes of the distributed register 142, e.g., a PBFT consensus mechanism. Once a threshold number of consensus inputs to validate the pending block 202 has been reached, the pending block 202 may be appended to the distributed register 142. In such embodiments, nonce values and difficulty values may be absent from the block headers. In still other embodiments, the consensus algorithm may be a Proof-of-Stake mechanism in which the stake (e.g., amount of digital currency, reputation value, or the like) may influence the degree to which the node may participate in consensus and select the next proposed block. In other embodiments, the consensus algorithm may be a Proof-of-Authority mechanism in which the identity of the validator itself (with an attached reputation value) may be used to validate proposed data records (e.g., the ability to participate in consensus/approval of proposed data records may be limited to approved and/or authorized validator nodes). In yet other embodiments, the consensus algorithm may comprise a manual node approval process rather than an automated process.

FIG. 3 is a flow diagram illustrating a process for performing synchronization of computer code across multiple computing environments using a distributed register, in accordance with one embodiment of the present disclosure. The process begins at block 301, where the system detects, using a machine learning algorithm, a change in a first set of code within a first environment. In particular, the machine learning algorithm may be configured to detect changes in source code such as changes to the source code's layout, content, structure, or the like, which may in turn cause changes in the way that data is processed and/or stored within various other environments (e.g., the production environment). Accordingly, the first environment may refer to a lower level or testing environment in which the application in question is being developed and/or being tested. Upon detecting the change in the first set of code within the first environment, the system may submit a proposed data record to the distributed register, where the proposed data record may indicate the changes to the first set of code.

The process continues to block 302, where the system executes a parallel analysis on the first set of code using the machine learning algorithm, wherein the parallel analysis comprises pulling a second set of code and data associated with the second set of code from a second environment and predicting one or more effects of the change in the first set of code on the second set of code. In particular, the machine learning algorithm may, through the parallel analysis, determine what impacts said changes in the source code will have on how data is handled (e.g., in the production environment). In this regard, the machine learning algorithm may be trained (e.g., via unsupervised learning) using production data (e.g., data within the production environment that is stored and/or processed by the applications for which the source code is being analyzed) such that the machine learning algorithm may detect the consequences of the change in source code on said production data (e.g., changes in data type, data lengths and/or constraints, and the like). Subsequently, the system may pull the application code from the production environment (e.g., the second set of code within the second environment) along with data from the production environment (e.g., the data associated with the second set of code) and compare the code from the testing environment (e.g., the first set of code) with the code from the production environment (e.g., the second set of code).

The process continues to block 303, where the system determines, based on the parallel analysis, that a second set of code requires an update. The system may determine that the second set of code requires an update, for instance, if there is a change in the way that data is processed and/or stored by the production application as a result of the source code change from the lower level environment. For example, a software update created in the testing environment, if applied to the application in the production environment, may have an impact on the data stored within a particular column of a table within a relational database. Accordingly, an update would be necessary to ensure synchronization of the code and structures for handling the data.

The process continues to block 304, where the system submits a proposed data record to a distributed server network for addition to a distributed register, wherein the proposed data record comprises one or more recommended actions based on the parallel analysis. The one or more recommended actions may comprise a modification of the first set of code and/or the second set of code such that the sets of code are synchronized with respect to the handling of data. Accordingly, the changes in the sets of code may take into account modifications of data type, length or other constraints, or the like. In this regard, the proposed data record may comprise the results of the parallel analysis as well as the one or more proposed changes to any of the sets of code. In some embodiments, the proposed data record may contain the proposed changes in executable form such that the system may automatically implement the proposed changes to the sets of code.

The process continues to block 305, where the system receives, from a plurality of nodes of the distributed server network, one or more consensus inputs associated with the proposed data record. Once the proposed data record is submitted, the nodes which host the distributed register may provide their approvals and/or rejections of the code changes as provided in the proposed data record. Accordingly, in some embodiments, the nodes of the distributed register may be operated by the stakeholders of the code (e.g., the developers, administrators, users, or the like) which may be associated with the use and/or development of the application. Accordingly, the consensus inputs may comprise an approval of the proposed data record or rejection of the proposed data record.

The process continues to block 306, where the system, based on the consensus inputs, appends the proposed data record to the distributed register. In this way, the system may provide a durable way to store a complete log of changes to the source code that have been approved and/or rejected by the various stakeholders. The system may use a consensus algorithm to determine whether the proposed data record is ultimately appended to the distributed register. If consensus is reached, the proposed data record may be appended to the distributed register. In some embodiments, the system may be configured, based on receiving the requisite number of approvals from the various users, be configured to automatically implement the one or more recommendations within the proposed data record, where the recommendations may include one or more changes to the first set of code and/or the second set of code. In other embodiments, such as if the proposed data record is rejected, the changes may be withheld and the proposed data record may be blocked from addition to the distributed register. In yet other embodiments, the proposed data record may be appended to the distributed register with an indication that the proposed data record was rejected. In such embodiments, the data record may further comprise an explanation as to why the proposed data record was rejected.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for computer code development environment cloning and authentication using a distributed server network and machine learning, the system comprising:
　a memory device with computer-readable program code stored thereon;
　a communication device; and
　a processing device operatively coupled to the memory device and the communication device, wherein the processing device is configured to execute the computer-readable program code to:
　　detect, using a machine learning algorithm, a change in a first set of code within a first environment;
　　execute a parallel analysis on the first set of code using the machine learning algorithm, wherein the parallel analysis comprises:
　　　pulling a second set of code and data associated with the second set of code from a second environment, wherein the second environment is a production environment, wherein the data associated with the second set of code comprises production data;

predicting one or more effects of the change in the first set of code on the production data; and based on predicting the one or more effects on the production data, generate one or more recommended actions for changing the second set of code, wherein the one or more recommended actions comprises setting a data length constraint for the production data;

determine, based on the parallel analysis, that the second set of code requires an update;

submit a proposed data record to a distributed server network for addition to a distributed register, wherein the proposed data record comprises one or more recommended actions based on the parallel analysis;

receive, from a plurality of nodes of the distributed server network, one or more consensus inputs associated with the proposed data record; and based on the consensus inputs, append the proposed data record to the distributed register.

2. The system according to claim 1, wherein the one or more consensus inputs comprise one or more approvals of the one or more recommended actions within the proposed data record, wherein the computer-readable program code further causes the processing device to, based on the one or more approvals, automatically execute the recommended actions.

3. The system according to claim 1, wherein the one or more consensus inputs comprise one or more rejections of the one or more recommended actions within the proposed data record, wherein the computer-readable program code further causes the processing device to add an indication that the one or more recommended actions have been rejected to the proposed data record.

4. The system according to claim 1, wherein the one or more recommendations comprises a change in the second set of code based on the change in the first set of code.

5. The system according to claim 1, wherein the one or more recommendations comprises a change in the first set of code based on the change in the first set of code.

6. The system according to claim 1, wherein the change in the first set of code comprises at least one of a layout change and a structure change.

7. The system according to claim 1, wherein the one or more effects of the change in the first set of code comprises a data type change.

8. A computer program product for computer code development environment cloning and authentication using a distributed server network and machine learning, the computer program product comprising at least one non-transitory computer readable medium having computer-readable program code portions embodied therein, the computer-readable program code portions comprising executable portions for:

detecting, using a machine learning algorithm, a change in a first set of code within a first environment;

executing a parallel analysis on the first set of code using the machine learning algorithm, wherein the parallel analysis comprises:

pulling a second set of code and data associated with the second set of code from a second environment, wherein the second environment is a production environment, wherein the data associated with the second set of code comprises production data;

predicting one or more effects of the change in the first set of code on the production data; and based on predicting the one or more effects on the production data, generate one or more recommended actions for changing the second set of code, wherein the one or more recommended actions comprises setting a data length constraint for the production data;

determining, based on the parallel analysis, that the second set of code requires an update;

submitting a proposed data record to a distributed server network for addition to a distributed register, wherein the proposed data record comprises one or more recommended actions based on the parallel analysis;

receiving, from a plurality of nodes of the distributed server network, one or more consensus inputs associated with the proposed data record; and based on the consensus inputs, appending the proposed data record to the distributed register.

9. The computer program product of claim 8, wherein the one or more consensus inputs comprise one or more approvals of the one or more recommended actions within the proposed data record, wherein the computer-readable program code portions further comprise executable portions for, based on the one or more approvals, automatically executing the recommended actions.

10. The computer program product of claim 8, wherein the one or more consensus inputs comprise one or more rejections of the one or more recommended actions within the proposed data record, wherein the computer-readable program code portions further comprise executable portions for adding an indication that the one or more recommended actions have been rejected to the proposed data record.

11. The computer program product of claim 8, wherein the one or more recommendations comprises a change in the second set of code based on the change in the first set of code.

12. The computer program product of claim 8, wherein the one or more recommendations comprises a change in the first set of code based on the change in the first set of code.

13. The computer program product of claim 8, wherein the change in the first set of code comprises at least one of a layout change and a structure change.

14. A computer-implemented method for computer code development environment cloning and authentication using a distributed server network and machine learning, the computer-implemented method comprising:

detecting, using a machine learning algorithm, a change in a first set of code within a first environment;

executing a parallel analysis on the first set of code using the machine learning algorithm, wherein the parallel analysis comprises:

pulling a second set of code and data associated with the second set of code from a second environment, wherein the second environment is a production environment, wherein the data associated with the second set of code comprises production data;

predicting one or more effects of the change in the first set of code on the production data; and based on predicting the one or more effects on the production data, generate one or more recommended actions for changing the second set of code, wherein the one or more recommended actions comprises setting a data length constraint for the production data;

determining, based on the parallel analysis, that the second set of code requires an update;

submitting a proposed data record to a distributed server network for addition to a distributed register, wherein the proposed data record comprises one or more recommended actions based on the parallel analysis;

receiving, from a plurality of nodes of the distributed server network, one or more consensus inputs associated with the proposed data record; and based on the consensus inputs, appending the proposed data record to the distributed register.

15. The computer-implemented method of claim 14, wherein the one or more consensus inputs comprise one or more approvals of the one or more recommended actions within the proposed data record, wherein the computer-implemented method further comprises, based on the one or more approvals, automatically executing the recommended actions.

16. The computer-implemented method of claim 14, wherein the one or more consensus inputs comprise one or more rejections of the one or more recommended actions within the proposed data record, wherein the computer-implemented method further comprises adding an indication that the one or more recommended actions have been rejected to the proposed data record.

17. The computer-implemented method of claim 14, wherein the one or more recommendations comprises a change in the second set of code based on the change in the first set of code.

18. The computer-implemented method of claim 14, wherein the one or more recommendations comprises a change in the first set of code based on the change in the first set of code.

19. The computer-implemented method of claim 14, wherein the change in the first set of code comprises at least one of a layout change and a structure change.

20. The computer-implemented method of claim 14, wherein the one or more effects of the change in the first set of code comprises a data type change.

* * * * *